June 16, 1936.  S. P. BURKE  2,044,665

APPARATUS FOR PARTIAL OXIDATION OF HYDROCARBONS

Original Filed June 11, 1930    3 Sheets-Sheet 1

INVENTOR
STEPHEN P. BURKE
BY
Edmund G. Borden ATTORNEY

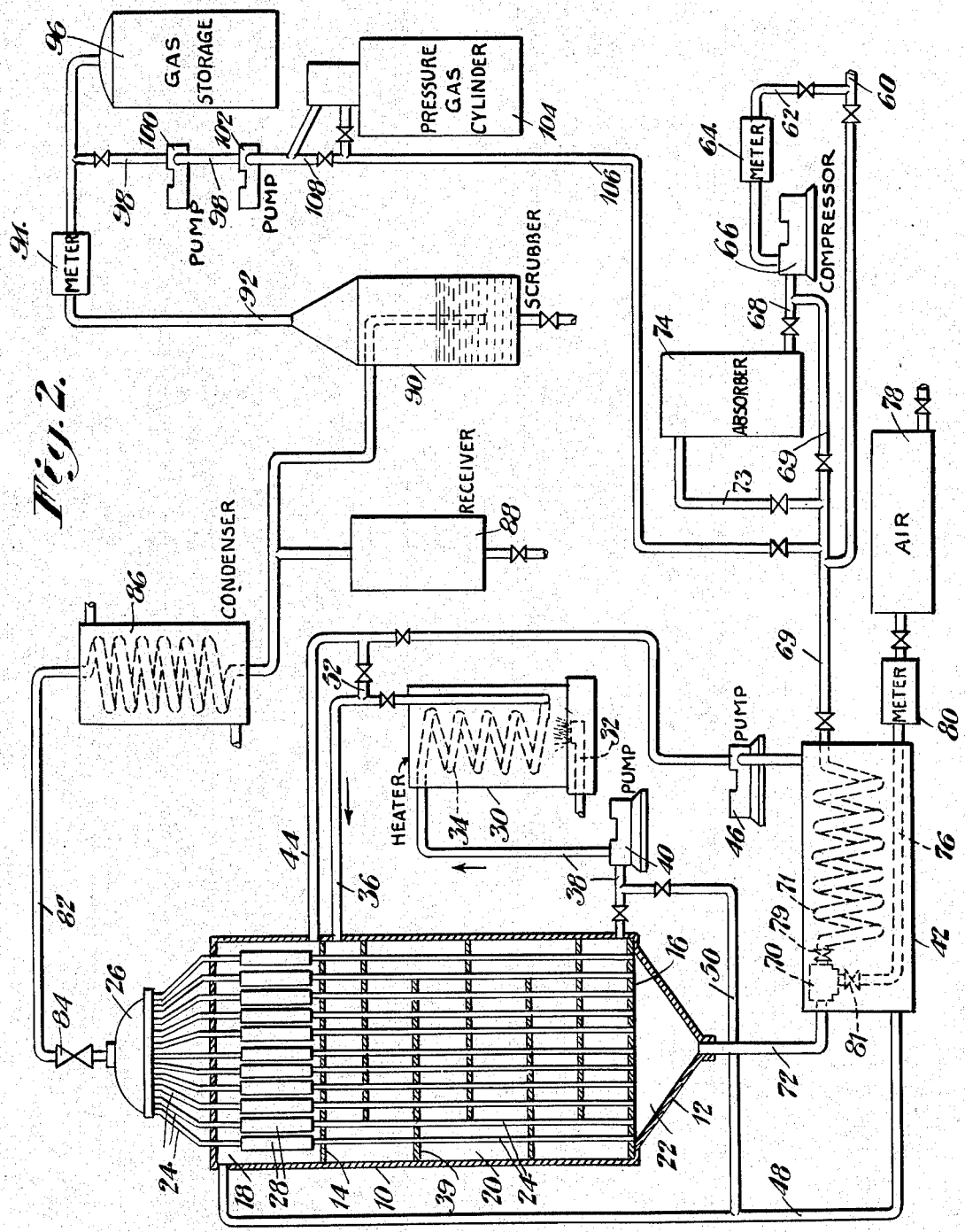

June 16, 1936. S. P. BURKE 2,044,665
APPARATUS FOR PARTIAL OXIDATION OF HYDROCARBONS
Original Filed June 11, 1930 3 Sheets-Sheet 3
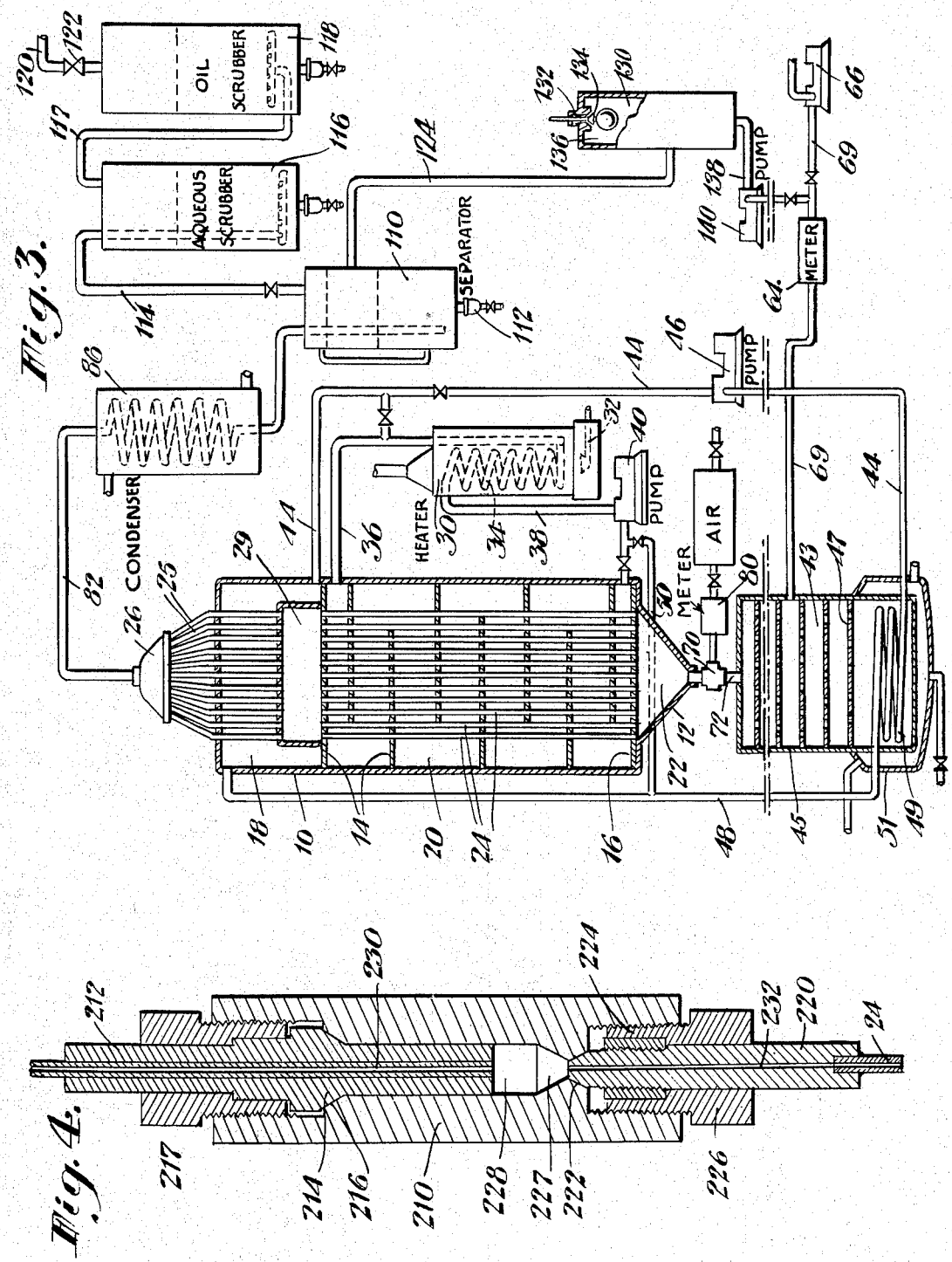
INVENTOR
STEPHEN P. BURKE
BY
ATTORNEY Patented June 16, 1936

2,044,665

UNITED STATES PATENT OFFICE 2,044,665

APPARATUS FOR PARTIAL OXIDATION OF HYDROCARBONS

Stephen P. Burke, Morgantown, W. Va., assignor to Doherty Research Company, New York, N. Y., a corporation of Delaware Original application June 11, 1930, Serial No. 460,319. Divided and this application August 22, 1933, Serial No. 686,258

3 Claims. (Cl. 23—277)

The present invention relates to apparatus for carrying out exothermic gaseous reactions, and particularly to apparatus adapted for the production of valuable intermediate partial oxidation products of gaseous or vaporized carbonaceous substances such as hydrocarbons, mixtures of these with hydrogen and carbon monoxide, such as are produced in coke oven plants, and similar mixtures. It is of particular utility in connection with the homogeneous oxidation of hydrocarbons of the methane series for the production of aldehydes and alcohols.

The invention herein described was originally disclosed in my U. S. Patent 1,978,621 granted October 30, 1934, filed June 11, 1930, of which this is a division.

Many processes for the partial oxidation of hydrocarbon and the like are well known, in which the reacting materials in the gaseous state are premixed and passed under atmospheric or superatmospheric pressure through an elongated reaction chamber immersed in a constant temperature heating bath. The reaction products are led away, and are subsequently treated to recover the normally liquid components thereof by suitable condensation and absorption under appropriate conditions. In many instances the reaction chamber contains certain catalysts adapted to facilitate the desired reactions and to retard other reactions tending to the production of complete oxidation products.

In these prior processes in which reaction tubes of uniform bore are employed, many difficulties are encountered in the proper control of the reactions occurring therein. Especially is this true where superatmospheric pressures are employed, so that as the gaseous mixture is heated to the reaction temperature, considerable fluctuations of pressure occur in the system due to the necessity for the employment of a relatively long reaction tube and to the tendency for the reaction to successively propagate backward and forward in the tube. Under certain conditions these pressure fluctuations may become so large as to prevent the proper control of the conditions in the system. As the percentage of oxygen present in the gas mixture is increased, these pressure fluctuations become more serious; and it has been found practically impossible to obtain satisfactory results employing oxygen concentrations above 14 per cent when using a uniform bore tube. Furthermore at the higher oxygen concentrations the formation of carbon taking place frequently causes blocking of these reaction tubes.

Among the more important objects of the present invention are to provide an improved apparatus having a design adapted for controlling the temperature of exothermic gaseous reactions and for confining the reaction to a definite, relatively-small zone in the system; to provide in an improved manner for preventing substantial pressure fluctuations in a system for the partial oxidation of hydrocarbons and the like; to provide apparatus of the type referred to having provision for the rapid cooling of the products of such reaction to insure their preservation; to provide means for so controlling these exothermic gaseous reactions as to assure a smoothly-progressing, uniform reaction irrespective of appreciable variations in the temperature of the heating bath surrounding the reaction chamber; and to provide apparatus adapted for the partial oxidation of hydrocarbons such as methane at temperatures substantially below those normally suitable for the purpose and at which temperatures substantially no thermal decomposition of the hydrocarbons or products of reaction would occur.

The present invention is based in part on the discovery that in the processing of gas mixtures of the character mentioned above,—the temperature at which the partial oxidation reaction is initiated is lowered as the diameter of the reaction tube is increased, where the total rate of flow of the gas mixture remains constant. This may be explained as due to the inhibitory influence of the wall surface of the tubes which suppresses the homogeneous reaction, (which is evidently of the chain type), by which the desired partial oxidation products are normally produced; or one may regard the phenomenon as being due to the difference in rate of heat transfer using tubes of varying diameter.

It has been found possible so to select the diameter and length of tubing conducting the highly-heated gas mixture to the reaction chamber that all reaction is entirely suppressed during its passage therethrough, although the gas is at a suitable temperature to initiate and support the desired partial oxidation reaction when the gas mixture subsequently flows into a short reaction chamber of suitably-increased cross section and having a larger ratio of volume to wall surface than said tubing. The reaction chamber may be immersed in a heating bath maintained at the same temperature as the gas entering therein, or it may be maintained at a substantially lower temperature for cooling the reaction chamber, as will be hereinafter described. The desired reaction is thereby limited to the relatively small volume of the small reaction chamber, and a smooth uniform reaction is obtained, which prevents pressure fluctuations in the system and gives uniformity of results.

In carrying out partial oxidation reactions in the improved apparatus forming the invention, the hydrocarbons, or a suitable mixture thereof with a hydrogen-containing substance and/or a carbon oxide-containing substance, are vaporized where necessary, after which they are mixed with air, oxygen, or other oxygen-supplying gas in the usual way. This gas mixture is then passed through small tubes immersed in a constant temperature bath and maintained at the desired reaction temperature for a suitable length of time to permit the necessary heat transfer to the gases flowing through the tubes. The preheated gases then flow into enlarged chambers which may form part of the said tube assembly or may be separate therefrom, in which chambers the desired reaction occurs suddenly. The gaseous reaction products formed then flow from these chambers through small metal tubes substantially of the size of those employed in preheating the gas mixture, which effects an immediate extinguishment of the reaction, due in part to heat transfer from the reacting gases, if such reaction has not been completed already. The reaction gases are then passed through a suitable train of condensers and separators by which the condensible vapors are condensed and are separated from the permanent gases. The latter, including any unreacted hydrocarbons, oxygen and the like, may then be mixed with fresh quantities of reactants and recycled in the process. Where the reaction is to be carried out under superatmospheric pressure, it is essential that means be employed for producing in the various lines the desired pressure, and that an expansion valve or pressure relief valve be disposed in the vapor offtake line leading from the reaction chamber either before or after the condensible vapors have been condensed.

In the accompanying drawings which illustrate certain preferred embodiments of the invention,—

Fig. 2 shows in somewhat diagrammatic manner an apparatus assembly illustrative of the preferred form of the invention;

Fig. 3 is an apparatus assembly illustrating a second modification of the invention; and Fig. 4 is a vertical section of one form of chambered reaction tube.

Figure 1:
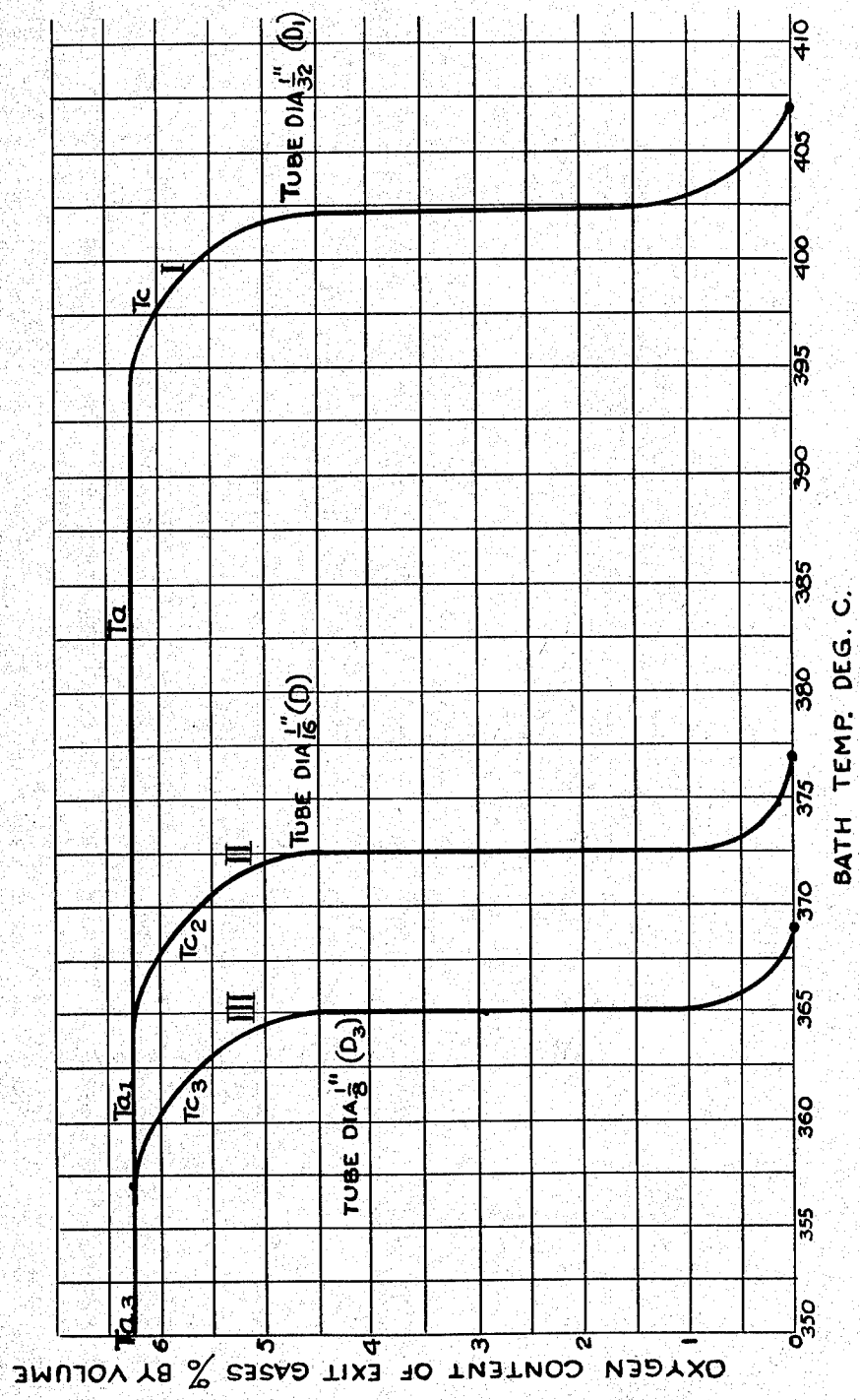
Fig. 1 is a graphic representation of the relationship between reaction tube diameter and the reaction temperature, involving the principles underlying the invention.

It has been found that when a gaseous mixture capable of undergoing homogeneous thermal explosion (such for example as a mixture of hydrocarbon and oxygen which can be caused to react extremely rapidly and homogeneously to produce organic oxidation products) is led through a tube of uniform diameter which is heated externally, the temperature of the gas in the tube naturally increases as it proceeds through the tube, always tending to approach the temperature of the heating medium. It has been demonstrated beyond reasonable doubt that during the course of this heating a small amount of reaction occurs between the reactants. Since the reactions referred to are highly exothermic, a small amount of heat is liberated so that the temperature existing in the gas as it proceeds through the tube is slightly higher than would be the case for the same gases if no reaction occurred. However, the amount of this reaction is so small that the ordinary analytical methods for gases will detect no change in the composition of the gas in the tube. When, however, the gas mixture in the course of its passage through the tube attains a certain temperature, which we may term the "critical temperature" ($T_c$), reaction suddenly occurs and proceeds to completion almost instantaneously. In the case of a mixture of hydrocarbons and oxygen, where hydrocarbons are in considerable excess, the oxygen content of the gas mixture which was unchanged in the course of passage through the tube up to a temperature just below the critical temperature suddenly completely disappears and is replaced by products of oxidation.

If we employ a liquid bath with a uniform temperature as the heating medium and immerse the tube through which the gas must be passed in the bath and slowly raise the temperature of the bath while measuring the oxygen content in the gases issuing from the tube, we find that the oxygen content remains unchanged as the temperature of the bath increases until a certain temperature is reached and then the oxygen disappears entirely. The curve (I) of Fig. 1, representing the variation of oxygen content with bath temperature is quite typical of hundreds of runs of this character that we have carried out. Now, if we replace the previous tube by another tube of exactly the same length but of larger diameter, and pass the same total quantity of gas mixture of the same initial composition through a larger tube at the same rate as employed in the previous case, and again plot the oxygen content of the issuing gases versus the temperature of the bath, we obtain a curve similar to curve 2 of Fig. 1. The phenomenon in both cases is identical except that the use of the larger tube has lowered the temperature to which the bath must be raised in order to cause reaction to occur. If the diameter of the tube is made still larger, all other conditions remaining as just described, a curve similar to curve 3 is obtained. It will be observed that as the diameter of the tube increases the temperature to which the heating media must be brought to cause reaction steadily decreases. It is noteworthy that successively equal increments of tube diameter cause smaller and smaller reductions in the temperature to which the bath must be raised to cause reaction.

Now, it must be obvious that if we employ a small diameter tube, of diameter ($D_1$), we may heat the bath to a temperature ($T_a$) (indicated on the graph) without having any appreciable reaction occur. If we now cause the gas to issue from the tube I, into the tube III having a diameter $D_3$, reaction immediately ensues, because the bath is at a temperature in excess of that necessary to cause reaction in the tube of diameter $D_3$. Therefore by building a reaction system composed of tubes of small diameter leading into chambers of large diameter and all maintained at a uniform temperature, it is possible, by proper control of the bath temperature, to preheat the reaction mixture in the smaller tubes to a temperature in excess of that required to cause reaction in the larger chamber without having any measurable reaction in the smaller tube. It is furthermore a fact that if the gas is caused to issue from the chambers into tubes of small diameter, either equal to or smaller than the inlet tubes, the reaction initiated in the chambers can in most cases be extinguished. This briefly describes the phenomena which forms the basis of this patent application. It is subject to modification, as will be hereinafter pointed out. For example, it is not necessary that the chamber be at the same temperature as the preheater tubes; where a sufficiently large increase of diameter is employed in passing from the preheater tube to the chamber, the chamber can actually be surrounded by a bath at a lower temperature than that surrounding the preheater tubes.

In the drawings, numeral 10 designates an elongated closed vessel which may have its exterior wall surface heat-insulated if desired. The vessel 10 has a conical bottom 12, and is provided with partitions 14, 16 which divide the vessel into chambers 18, 20 and 22.

A plurality of elongated hollow metal tubes 24, which if desired may be made of catalytic material such as nickel, are disposed in parallel longitudinally of the vessel 10, passing through apertures in the partitions 14, 16—the said tubes having their open, lower ends disposed within the chamber 22.

Each tube 24 extends through an aperture in the top of vessel 10, and has its open upper end associated with a collection head 26. A mid-portion of each of the tubes 24 positioned within the chamber 18 is of increased diameter to form an enlarged reaction chamber 28.

For heating a heat-transferring fluid and for circulating the same around the tubes 24 in the chambers 18 and 20,—a heater 30 is provided, having a burner 32 and a heating coil 34, the respective ends of the latter being connected to the upper and lower ends of chamber 20 through the conduits 36, 38, the last-mentioned conduit having a pump or the like 40 located therein. A plurality of baffles 39 may if desired be arranged around the tubes in chamber 20.

A vaporizer 42 is connected with the upper and the lower portions of chamber 18 respectively by conduit 44 having therein pump 46, and by conduit 48. A conduit 50 connects conduits 38 and 48; and conduit 52 connects conduits 36 and 44.

For introducing into the reaction vessel the hydrocarbons to be processed, a conduit 60,—connected with a source of hydrocarbons, as for example natural gas,—is in communication with the chamber 22 through the pipe 62, meter 64, compressor 66, pipes 68 and 69, mixing valve 70 and conduit 72.

If desired, the hydrocarbon gas may be pumped from the compressor 66 through an absorber 74 to remove excess liquids present in the gas prior to being sent through the vaporizer,—or the gas may be pumped by the compressor direct into conduit 69 and thence to the vaporizer.

A valved air conduit 76, having a meter therein, leads from a source of air or other oxygen-supplying gas under pressure such as the tank 78, through the vaporizer 42 and communicates with the mixing valve 70. Check valves 79 and 81 are preferably placed in conduits 71 and 76 adjacent the valve 70 to prevent back flow through these conduits.

The collection head 26 has leading therefrom a vapor conduit 82 containing an expansion valve 84, connecting the former in series with a condenser 86, a receiver 88 and a gas scrubber 90. A vapor line 92 having therein a flow meter 94 leads from the scrubber to a gas storage tank 96. A conduit 98 having therein a series of high pressure pumps 100, 102, establishes communication between conduit 92 and a compressed gas storage tank 104. A conduit 106 leads from tank 104 to raw gas conduit 69; and a short valve-controlled connection 108 permits direct communication of conduit 98 with the conduit 106.

In the operation of the apparatus shown in Fig. 2, the crude hydrocarbon or a mixture containing hydrocarbons such as natural gas is metered from line 60 and after suitable compression is passed through the absorber 74. The purified vapors are then passed through the coil in the vaporizer 42 where any remaining liquid is vaporized, and the vapors are given an initial preheat. Just prior to the point of exit of the vapors from the vaporizer they are mixed with air or other oxygen-supplying gas which may have been preheated if desired to the same temperature. This gas mixture enters chamber 12 and thence flows into and is distributed uniformly within the relatively narrow preheating tubes 24 through which it flows at a predetermined rate, being meanwhile heated to a high temperature by heat exchange with the heating fluid, such as fused sodium nitrate, or hot oil flowing around the tubes within the fluid circuit comprising the heater 30. The flow of vapors within the tubes 24 and the temperature of the heated fluid surrounding the tubes is so adjusted that the vapors are heated and maintained at a temperature below that at which the partial oxidation reaction is initiated in preheating tubes of the diameter employed, but above the temperature at which the said reaction will be initiated when the hot vapors flow into the larger diameter reaction chambers 28. As the hot vapors enter the latter, the reaction is instantly initiated, and it progresses rapidly. The mixed vapors then flow at once into the upper tube ends of smaller diameter, which cause the reaction at once to be extinguished. The heat generated by the reaction in the chambers 28 is conducted away from the chamber walls by the heat-transferring fluid flowing in the circuit including chamber 18 and the vaporizer 42, in the latter of which it is used to assist in heating indirectly the incoming gas mixture to be reacted. If desired, the said fluid flowing through chamber 18 may be heated by passage through conduits 48, 50, 38, heater 30, and conduits 52 and 44.

The vaporized reaction mixture leaving the upper ends of the tubes 24 passes the expansion valve 84 where the pressure is reduced to substantially atmospheric pressure, and the vapors then pass through a cooler and condenser in which portions of the vapors are condensed and the condensate recovered in a receiver,—the uncondensed vapors passing into a vessel containing a scrubbing liquid such as water or glycerine which absorbs or dissolves certain valuable gaseous partial oxidation products, the fixed gases then passing to gas storage at atmospheric or superatmospheric pressure; or the mixed gases may be immediately recycled under appropriate pressure. Instead of having the expansion valve 84 in the conduit 82, it may be located in the conduit leading from the condenser to the absorber 90 and between the latter and the receiver 88; or it may be placed in the gas conduit 92.

According to the modification of the invention illustrated in Fig. 3, which is adapted especially for processing the higher hydrocarbons including propane, butane and the like, the arrangement of the preheating vessel and tube assembly, is similar to that shown in Fig. 2. In place of the type of vaporizer shown in Fig. 2, there is provided a heat-insulated column still 43 having the usual dephlegmating column 45 equipped with the perforated metal plates 47. The hydrocarbon to be vaporized enters the mid-portion of the column through the pipe 69; and the gaseous hydrocarbon is withdrawn through the conduit 72 connected to the top of the still. For heating the contents of the still, a heating coil 49 or a jacket 51, or both is provided. If desired, the ends of the heating coil may be connected respectively with the conduits 44 and 48. One large reaction chamber 29 is disposed within chamber 18, into which each of the tubes 24 extends,—in place of the individual reaction chambers 28 shown in Fig. 2. A plurality of relatively small tubes 25 extend from the reaction chamber 29 to the collection head 26.

A conduit 82 leads from the collection head 26 through a condenser 86 to a separator chamber 110, having a valve-controlled draw-off line 112 connected with the bottom thereof. A vapor line 114 leads from the top of the separator chamber 110 to a series of scrubbing vessels 116, 118, each having a valved draw-off line in the bottom. A vapor conduit 120 leading from the top of the scrubber 118 has therein an expansion valve 122, adapted for holding the desired pressure on the system and for permitting escape from the latter of the scrubbed fixed gases consisting mainly of nitrogen, hydrogen and carbon dioxide. A conduit 124 connects a mid-portion of the separator chamber 110 with a tower 130 provided in its upper end with an aperture 132 normally controlled by a gas release valve comprising a valve seat 134 and a metal float 136 adapted to float on the liquid hydrocarbon within the tower and to seat securely against the said valve seat when in its uppermost position to seal the interior of the tower 130 from the atmosphere. A conduit 138 leads from the lower part of the tower 130 through a high-pressure pump 140, into the pipe line 69.

The operation of the apparatus of Fig. 3 is similar in most respects to that of Fig. 2. A controlled pressure is maintained on the fluid hydrocarbon mixture within the portion of the circuit comprising the line 69, vaporizer 43, preheater tubes 24, reaction chamber 29, and the vessels 110, 116, 118, and 130 by means of pumps 66 and 140.

In the form of the invention shown in Figs. 2 and 4, the reaction tube consists of a hollow body 210 of cold rolled steel or other suitable material adapted to withstand high pressures and temperatures. The body 210 has a central aperture which is enlarged at one end of the said body to house a shouldered head or member 212 having a constricted bevelled mid-portion 214 adapted to seat against a sloping mid-portion 216 of the inner wall of the body 210. A threaded gland and pressure-applying member 217 engages threads in the body 210 and functions to press the head 212 against the sloping mid-portion 216 of the body 210.

A second apertured head 220, having a bevelled end portion 222 and a threaded portion adjacent thereto adapted to engage threads on the inner surface of a sleeve 224 thereon, is adapted to have its bevelled end 222 pressingly engage a sloping internal shoulder within the body 210 by cooperation with a threaded gland nut 226, the latter engaging threads in the aperture in the body at the end thereof opposite that carrying the member 217.

The lower end of the head 212 extends within the apertured body 210 to a point near but removed from a second constricted portion 227, so that an enclosed chamber 228 is formed between the adjacent ends of the heads 212 and 220 and the internal wall of the body 210 included therebetween. The chamber 228 is in communication with tubes 24 through relatively small central apertures 230, 232, in the respective heads, 212 and 220.

Instead of employing steel as the material of construction for the reaction tubes, various other metals and alloys may be used, which may or may not have catalytic properties with respect to the partial oxidation reaction. In this manner, nickel tubes may be utilized.

In carrying out partial oxidation of hydrocarbons in apparatus of the character described above, it invariably occurs that, while it is necessary to raise the heating bath and the gas mixture flowing therethrough to a given minimum temperature (varying with the conditions of operation) in order to initiate the desired reaction, no reaction occurs at such temperature until the gas mixture flows into the enlarged reaction chamber at which point the said reaction occurs instantly and all or the major part of the oxygen reacts and is removed from the mixture. As soon as the desired reaction has been started, the entire system including the heating bath may be cooled down from 25° to 100° C. or more depending upon the conditions of the reaction, the gases used, etc. without causing the reaction to cease. This may be described as a hysteresis effect, and it makes possible uninterrupted operation, irrespective of relatively large fluctuations in the temperature of the heating bath surrounding the reaction chamber and the tubes conveying the gas mixture to the reaction chamber. Furthermore it has been found possible to carry out the reaction at appreciably lower temperatures than would be possible under similar conditions with reaction tubes of uniform diameter. This is especially important where gases such as methane which are highly resistant to the partial oxidation treatment are being processed, so that the temperatures employed need not be in the range of those effective for thermally decomposing the hydrocarbon to form free carbon so as to seriously reduce the yields of valuable partial oxidation products obtained.

For the purpose of illustrating certain applications of the invention the following examples are given; but it is to be understood that they are in no way to be regarded as limiting the scope of the invention beyond that which is set out in the accompanying claims.

A quantity of propane was vaporized and preheated to a temperature of approximately 150° to 160° C. and thereafter was mixed with air heated to the same temperature in proportions sufficient to give the resultant mixture an oxygen concentration of 6.15%. This gas mixture was passed under a pressure of 750 lbs. per square inch through a 51-inch length of Shelby steel tubing of $\frac{3}{4}$ inch inside diameter, during which time it was brought up to a reaction temperature of 339° C. No reaction whatever occurred under these conditions. From this tubing the mixture flowed into a steel reaction chamber of the type described above, having an inside diameter of $1\frac{3}{4}''$, and an internal length of $1\frac{3}{4}''$. The fluid inlet end of the chamber was cone-shaped as shown in Fig. 4. The entering gas flowed through the reaction tube at a rate of 15.4 cubic ft. per hour; and the reaction within the chamber was completed in approximately .33 second after which the reaction mixture passed into an outlet pipe of Shelby tubing having an internal diameter of 7/32", and the reaction was promptly extinguished. As soon as the reaction had begun, the temperature of the heating bath could be reduced to as low as 291° C., without substantially affecting either the rate of the partial oxidation reaction or the character of the products obtained. A temperature of ½ reaction of 339° C. was recorded.

The gases issuing from the reaction chamber were found to contain 1 per cent of oxygen in instances where the preheating bath was maintained at a temperature of 339° C. and below; whereas as the temperature of the heating bath was increased to 393° C. this oxygen was increasingly consumed until at the latter temperature all of the oxygen had been entirely consumed. At the higher temperatures there was a tendency for the percentage of unsaturated hydrocarbons in the off-going gases to increase, but the percentage of carbon monoxide did not vary materially. The acidity of the drip recovered at the lower temperatures was somewhat higher than that obtained at the higher temperature,—and very satisfactory yields of methanol and aldehydes were recovered at the various points within the temperature range of 291° to 390° C. In a similar run in which the reaction chamber had an internal diameter of 13/64 inch and an internal length of 26/64 inch, a propane air mixture containing 5.9 per cent of oxygen, maintained at 750 lbs. per square inch pressure, and flowing at 15.5 cu. ft. per hour, showed a temperature of half reaction of 372° C. It was possible to lower the temperature of the preheating bath to 345° C. without extinguishing the reaction in the reaction chamber, although in such instances the offgoing gases contained approximately 1.9 per cent of residual oxygen. To effect complete removal of the oxygen a temperature of 395° C. was necessary.

Similar gas mixtures containing other percentages of oxygen than that recorded above give somewhat similar results. The higher the percentage of oxygen present in the original gas mixture, the lower was the temperature of half reaction and that of complete reaction. Furthermore, the permissible drop in temperature of the preheating bath below the temperature required for initiating the reaction, and which would still permit maintenance of the reaction, varied directly with the percentage of oxygen in the gas mixture being treated.

The temperature spread or range between that of half-reaction and that of complete reaction decreases as the oxygen-content of the gas mixture increases; and at oxygen percentages of 14 per cent and above, these two values were approximately the same. Oxygen percentages as high as 18 per cent of the gas mixture,—equivalent to mixtures containing 10 per cent propane and 90 per cent air,—could be effectively treated in accordance with the present invention without the formation of carbon in the system, and with resultant substantial yields of valuable partial oxidation products including methanol and formaldehyde, although the most satisfactory yields of these products were obtained with oxygen concentrations around 6 per cent.

To illustrate the character of the results obtained when processing an oxidation-resistant gas normally requiring high temperatures for its conversion,—a mixture of methane and air containing 6.4 per cent of oxygen, while under a pressure of 750 lbs. per square inch, was flowed at a rate of approximately 15 cubic feet per hour through a length of Shelby steel tubing having an inside diameter of 7/32 inch and was preheated to a temperature of 468° C. This preheated mixture was then flowed into an enlarged reaction chamber of the type described above, whereupon immediate reaction occurred, with the production of substantial quantities of partial oxidation products including methanol and formaldehyde. The reaction was extinguished by immediately passing the offgoing gases through another length of 7/32 inch inside diameter steel tubing. These offgoing gases contained approximately 2 per cent of residual oxygen, for the removal of which it was necessary to go to a temperature of around 525° C. On the other hand, following the initiation of the reaction at 468° C., the temperature of the reaction bath could be reduced to as low as 440° C. without substantially affecting the character of the reaction or the products formed thereby.

The extent to which the temperature of the reaction bath could be lowered below the temperature of half reaction (468° C.), without quenching the reaction may be varied by varying the oxygen content of the gas mixture being processed, other conditions remaining unchanged. Generally the higher the oxygen content of such mixture, the greater the spread between the temperature of half-reaction and that at which reaction is extinguished within the reaction chamber.

Reference has been heretofore made in this case to the temperature of half-reaction, by which is meant the temperature at which half of the oxygen of the initial reaction mixture has been used up. This temperature is recorded because of the fact that it has been found difficult to accurately measure the temperature at which the reaction is initiated or that at which it is complete, while an accurate measurement of the temperature at which half of the oxygen has been consumed can readily be obtained.

In carrying out partial oxidation in the apparatus assembly of Fig. 2, a mixture of hydrocarbons, such as natural gas may be flowed through the preheating coil 71 under the desired pressure induced by the compressor 66, and any condensed liquids are removed in the absorber 74. The natural gas is then mixed in the mixing valve 70 with air which has been pre-heated to the same temperature while passing through pipe 76. The gas mixture then flows into the small steel tubes 24 in vessel 10 around which tubes is circulated a heating fluid such as a fused salt or the like, and wherein the gas mixture is brought up to the desired reaction temperature. The gas mixture then flows into the reaction chambers 28 which are immersed in the heat-transferring bath in chamber 18, which bath may be maintained at the same temperature or at a lower temperature than that of the heat-transferring fluid in chamber 20. The gaseous products of the reaction then flow through the small tubes 24, header 26 and through the expansion valve 84 where the pressure is reduced substantially at atmospheric pressure. The gases then flow through the condenser 86 where condensible vapors are condensed and flow into the receiving vessel 88. The remaining gases flow into the separator 90 below the level of the liquid such as water therein, which absorbs therefrom the constituents condensible or soluble therein,—the remaining or permanent gases being drawn off through line 92 to gas storage tank 96, or they may be pumped direct by means of the booster pumps 100 and 102 to the pressure storage cylinder 104. These gases containing some unreacted hydrocarbons and, in some instances, small amounts of oxygen, may then be recirculated in a second cycle of operation, after being fortified with suitable amounts of natural gas or other hydrocarbons through the line 69. The temperature of the preheating baths may be maintained in part by circulation of the preheating fluid through one or more heaters 30, and in part by the heat of reaction transmitted thereto by the reacting gases through the walls of the reaction vessels 28. Other suitable methods for maintaining the desired bath temperatures will readily suggest themselves and may be employed.

Instead of using a plurality of relatively small reaction chambers in the manner shown in Fig. 2, a single large reaction chamber may be employed into which the various small tubes conveying the incoming preheated gas mixtures may feed the latter. This arrangement does not permit the effective removal of the heat of reaction of the gas mixture to the same degree as the arrangement shown in Fig. 2. Fig. 3 illustrates the preferred arrangement where propane or other gas which is liquefiable under the conditions of use in the process is to be employed. In the operation of the process when using the apparatus of Fig. 3, the gaseous or vaporized hydrocarbons and air or other oxygen-supplying gas are mixed in the vaporizer and are pre-heated in the small tubes 24 before entering this single large reaction chamber 29. The off-coming vapors flow through the collection head and conduit 82 to a condenser, and thence into the separator 110 in which the condensed liquid is permitted to settle and stratify, thus forming a lower aqueous layer containing liquid partial oxidation products, and an upper oily layer composed of unreacted hydrocarbons such as propane that are liquid at the temperatures and pressures maintained in the separators. This latter layer contains some of the aqueous products in suspension therein, and also some of the gaseous reaction products which are soluble in the propane at the pressures used. The aqueous reaction products are withdrawn from the separator and subjected to the usual type of refining process for recovering the aldehydes, alcohols, and other materials therein. The propane is withdrawn either continuously or intermittently through conduit 124 and led to the tower 130. In the latter the dissolved gases are permitted to escape from the hydrocarbons to the atmosphere. The float valve 136 functions to prevent overflow and loss of the liquid hydrocarbon should the latter flow into the tower 130 at a faster rate than the degassed liquid is pumped therefrom into the line 69 for recycling in the process.

The fixed gases flow from the separator 110 through conduit 114 into the scrubber 116 which contains water or an aqueous solution such as glycerine, where any occluded aqueous partial oxidation products not recovered in the separator are removed therefrom, and may be withdrawn through the valved line in the bottom. The remaining gases then flow through conduit 117 into the oil scrubber 118 containing an oil such as kerosene, in which oil, any residual propane or other hydrocarbon is absorbed and may be removed therefrom by suitable treatment after withdrawal of the oil through the bottom valved conduit. The residual gases flow from the oil scrubber past the expansion valve 122 to suitable storage, or may be discharged to the open air.

In this modification of the invention, the expansion valve is so placed that a major portion of the heat of reaction is removed from the gases flowing from the reaction chamber prior to the reduction of the pressure to atmospheric pressure.

While in the examples given, hydrocarbons and air have been the respective gases employed, it will be obvious that the apparatus is adapted for the treatment of mixtures of hydrocarbons with chlorinating agents, oxygen, and various other oxygen-supplying gases whereby reactions of the well-known thermal explosion type are initiated. Furthermore it is possible to operate at atmospheric pressure or at various other pressures above or below atmospheric instead of at the pressures specifically mentioned herein. There is a tendency for the methanol content of the gases to increase with increase in pressure, and particularly at pressure above 250 pounds per square inch.

The invention is well adapted for use in connection with homogeneous catalysts such as the nitrogen oxides, methyl ether, and the like. These may be introduced into the gas stream just before the latter enters the reaction chamber, or at some point within the preheater. In some instances the reaction chamber may be constructed of a particular material having catalytic properties adapted to promote the desired partial oxidation reactions. Furthermore the inner surface of the reaction chamber may be coated with a suitable catalytic material such as nickel. In the latter case this may be done by introducing some of the catalyst into the gas stream before it enters the reaction chamber. For instance, nickel carbonyl may be introduced into the gas mixture and flowed into the reaction chamber while heating the latter at temperatures suitable for decomposing the nickel carbonyl, whereby the walls of the chamber are plated or coated with nickel.

The invention is susceptible to modification within the scope of the appended claims.

I claim:

1. Apparatus adapted for carrying out exothermic gaseous reactions comprising, in communicably connected series, a heat interchanger, at least one elongated pressure-resistant preheating tube, a relatively short reaction chamber, an elongated reaction quenching and cooling tube, the said reaction chamber having a smaller ratio of wall surface to volume than that of the said preheating and cooling tubes communicating therewith; a heater, means for circulating a heat transferring fluid through the heater and in heat exchange relation with the preheating tube, and means for circulating a second heat transferring fluid in heat exchange relation with the reaction chamber and through the heat interchanger.

2. Apparatus adapted for carrying out exothermic gaseous reactions comprising, at least one elongated pressure-resistant preheating tube, a relatively short reaction chamber in communication with the discharge end of the preheating tube, the said reaction chamber having a smaller ratio of wall surface to volume than that of the said preheating tube communicating therewith, a heater, means for circulating a high temperature heat transferring fluid through said heater and in heat exchange relation with the preheating tube, a heat exchanger, and independent means for circulating a second heat transferring fluid through the heat exchanger and in heat exchange relation with the reaction chamber.

3. Apparatus adapted for carrying out exothermic gaseous reactions comprising, in communicably connected series, at least one elongated pressure-resistant preheating tube, a relatively short reaction chamber, and at least one elongated pressure-resistant reaction quenching and cooling tube, the said reaction chamber having a smaller ratio of wall surface to volume than that of the said preheating tube and cooling tube communicating therewith; a heater, means for circulating a high temperature heat transferring fluid through the heater and in heat exchange relation with a portion of the preheating tube leading to the inlet end of said reaction chamber, a heat exchanger, and independent means for circulating a second low temperature heat transferring fluid through the heat exchanger and in heat exchange relation with a portion of the cooling tube leading from the end of the reaction chamber opposite to that first mentioned.

STEPHEN P. BURKE.